US006007896A

United States Patent [19]
Bhushan

[11] Patent Number: 6,007,896
[45] Date of Patent: Dec. 28, 1999

[54] SURFACES HAVING OPTIMIZED SKEWNESS AND KURTOSIS PARAMETERS FOR REDUCED STATIC AND KINETIC FRICTION

[75] Inventor: Bharat Bhushan, Powell, Ohio

[73] Assignee: The Ohio State University, Columbus, Ohio

[21] Appl. No.: 09/055,615

[22] Filed: Apr. 6, 1998

Related U.S. Application Data

[63] Continuation-in-part of application No. 08/554,776, Nov. 7, 1995, Pat. No. 5,737,229.
[51] Int. Cl.$^6$ .................................................. G11B 3/70
[52] U.S. Cl. .................. 428/141; 428/65.3; 428/694 TR; 428/694 BR; 428/694 SG; 428/900; 360/135
[58] Field of Search ..................................... 428/141, 65.3, 428/694 TR, 694 BR, 694 SG, 900; 360/135

[56] References Cited

U.S. PATENT DOCUMENTS

| | | | |
|---|---|---|---|
| 4,334,282 | 6/1982 | Whitehouse | 364/728 |
| 4,619,869 | 10/1986 | Kiriyama et al. | 428/480 |
| 4,902,585 | 2/1990 | Ogawa et al. | 428/694 |
| 4,997,696 | 3/1991 | Kamada et al. | 428/141 |
| 5,057,352 | 10/1991 | Ando et al. | 428/141 |
| 5,169,703 | 12/1992 | Miyazaki et al. | 428/141 |
| 5,202,810 | 4/1993 | Nakamura et al. | 360/135 |
| 5,266,376 | 11/1993 | Okazaki et al. | 428/141 |
| 5,523,839 | 6/1996 | Robinson et al. | 356/349 |
| 5,674,625 | 10/1997 | Takahashi et al. | 428/428 |
| 5,737,229 | 4/1998 | Bhushan | 364/468.24 |

FOREIGN PATENT DOCUMENTS 6-49598  5/1994  Japan.

OTHER PUBLICATIONS

"Systems of Frequency Curves Generated by Methods of Translation" by N.L. Johnson, (1949), *Biometrika 36*, 149–167.

"A Meniscus Model for Optimization of Texturing and Liquid Lubrication of Magnetic Thin–Film Rigid Disks" Gao, et al., *Tribol. Trans.*, 38, 201–212.

*Primary Examiner*—Stevan A. Resan
*Attorney, Agent, or Firm*—Calfee, Halter & Griswold LLP

[57] ABSTRACT

A low friction non-gaussian surface is disclosed which has a positive skewness value and a kurtosis value of three or greater which minimizes static and kinetic friction and resultant wear in any instance of at least two surfaces in moving contact, including machine and computer components, magnetic media, and read/write heads which contact magnetic media. In a preferred embodiment, a magnetic media having an optimal non-gaussian surface roughness and method of surface parameter selection utilizes non-gaussian probability density functions in a contact model which accounts for the effects of roughness distribution and liquid film meniscus forces to determine optimum skewness and kurtosis values which minimize static and kinetic friction. The invention provides a magnetic media or other article of manufacture with a surface which has a positive skewness value and as high a kurtosis value as possible which minimizes or reduces static and kinetic friction and wear upon contact with another surface which may also be surface configured in accordance with the invention.

7 Claims, 12 Drawing Sheets

SURFACES HAVING OPTIMIZED SKEWNESS AND KURTOSIS PARAMETERS FOR REDUCED STATIC AND KINETIC FRICTION

RELATED APPLICATIONS

This application is a continuation in part of U.S. patent application Ser. No. 08/554,776, filed Nov. 7, 1995, now U.S. Pat. No. 5,737,229.

FIELD OF THE INVENTION

The present invention pertains generally to tribology and microtribology and specifically to tribology of low friction surfaces.

BACKGROUND OF THE INVENTION

Tribology, the study of contacting solid surfaces in relative motion, is applicable to every mechanical device and operation. Examples of productive wear are writing with a pencil, machining, and polishing. Examples of productive friction are brakes, clutches, driving wheels on trains and automobiles, bolts and nuts. Examples of unproductive friction and wear are internal combustion and aircraft engines, gears, cams, bearings and seals. According to some estimates, losses resulting from ignorance of tribology amount to roughly 6% of the U.S. gross national product, and approximately one-third of the world's energy resources in present use represent friction in one form or another. The science of tribology therefore seeks to minimize and eliminate losses resulting from friction and wear at all levels of technology involving moving contacting surfaces.

Magnetic recording is one area of modern technology which suffers from unproductive friction and wear. Magnetic recording is extensively used in audio, video, and digital applications in the form of tapes and disks. The industry is expected to grow by a factor of five or more in the next decade. This growth will be accompanied by dramatic improvements in the technology, and the potential exists for magnetic-recording densities to improve by at least one order of magnitude. Magnetic-recording is accomplished by relative motion between a magnetic head and a magnetic medium. Types of magnetic media for digital recording are: flexible media (tapes and floppy disks) and rigid disks. Physical contact between head and medium occurs during starts and stops ind hydrodynamic air films develops at high speeds. Flying heights (mean separation between head and medium) are on the order of 0.1 micrometer comparable to surface roughness of the mating members. The need for higher and higher recording densities requires that media surfaces be as smooth as possible and flying heights be as low as possible. Smoother surfaces lead to increased static and kinetic friction and wear. In the case of heads used in conjunction with rigid disks, the dynamics of a head are very critical in maintaining head-disk separation. All magnetic media have to be lubricated sufficiently to minimize head and magnetic-medium wear. The lubrication is carried out either topically or in bulk. Disk/head interface tribology is the limiting factor in achieving maximum data storage density.

High magnetic storage density in modern disk drives is achieved by the use of very smooth thin-film rigid disks that allow ultra-low flying of read/write head sliders over the disk surface. However, smooth surfaces result in stiction (high static friction) during rest and high stiction/friction during the contact start/stop (CSS) operation, especially with the presence of a thin film of liquid lubricant or aidsorbed water vapor at the head-disk interface. Disk surfaces are therefore textured to minimize stiction/friction. There is a critical $h/\sigma$ (total liquid film thickness/standard deviation of surface heights) above which stiction increases rapidly with an increase in the liquid film thickness. Distribution of local roughness plays an important role in friction/stiction and wear. Thus optimization of roughness distribution on the disk surface is required. In most models, surface height distribution is assumed to follow a gaussian distribution. However, engineering surfaces are frequently non-gaussian with the degree of non-gaussian characteristics dependent upon materials and surface finishing processes used. For example, magnetic rigid disk surfaces used in the magnetic storage industry are highly non-gaussian. The use of a gaussian analysis in such cases can lead to erroneous results.

Contact of two rough surfaces at an interface occurs at a small fraction of the nominal area of contact. Real area of contact and interfacial adhesion primarily control the friction of an interface. With the presence of a thin film of liquid lubricant or adsorbed water layer at the interface, menisci form around the contacting and near-contacting asperities. The meniscus formation results in stiction problems in the head-medium interfaces. Stiction in rigid disk drives is intimately related to the ratio of the liquid film thickness (h) and the composite standard deviation of the surface heights of disk and head surfaces ($\sigma$). For the same liquid film thickness, rougher disks (having a higher $\sigma$) exhibit a lower stiction than smoother disks (Bhushan, 1990). Normally in disk drives, the stiction induced with meniscus bridges is a more serious problem than the kinetic friction during sliding. CSS operations result in wear of surface making surfaces smoother which increases stiction after use. There is a need therefore for a magnetic media surface which has optimum roughness which minimizes friction and stiction to reduce wear and prolong the life of the recording media.

Based on classical theory of friction (Bowden and Tabor, 1950) the kinetic friction is proportional to the real area of contact which is high for smoother surfaces (Greenwood and Williamson, 1966). For partially wet contacts, menisci bridges are formed at the interface which result in intrinsic attractive (meniscus) force leading to high static friction. The number of bridges and asperities increase for smoother surfaces leading to high static friction. Thus minimum kinetic and static friction occurs for two rough surfaces, viz. a rough slider against a rough disk. This however does riot satisfy the objective of achieving a high recording density, which is obtained by the use of smooth surfaces for the head and the disk. Thus optimization of the roughness distribution of head and disk surfaces is required in order to satisfy both objectives. Optimization of surface roughness also reduces wear.

SUMMARY OF THE PRESENT INVENTION

The present invention provides a low friction surface and method of design which minimizes static and kinetic friction and resultant wear of parts in moving contact. The invention is applicable to any surfaces in moving (rolling or sliding or momentary) contact, wherein one or more of the surfaces in contact can be textured or formed or machined in accordance with the principles of the invention to achieve the defined surface parameters. One or more of the surfaces in contact may be textured or machined to have the defined parameters and attributes of the invention. In one particular aspect of the invention, the present invention provides a magnetic media and/or a read/write head having a nongaussian surface with a roughness distribution which minimizes static and kinetic friction by having positive skewness and high kurtosis values. In accordance with another particular aspect of the invention, a magnetic media has a low friction surface with a positive skewness value and a kurtosis value of 3 or greater. In accordance with another aspect of the invention, a magnetic media has a low friction surface with a skewness value in the approximate range of 0.0 to 0.2 and a kurtosis value in the approximate range of 3 to 10 or higher. The surfaces of the invention result in low or reduced wear of parts having such surfaces.

The invention further provides a method of determining an optimum non-gaussian surface for a magnetic storage device or magnetic media which minimizes or reduces static and kinetic friction and wear by using models of real area of contact, number ot contacts, contact pressure and meniscus force at wet interfaces in probability density functions or computer generated surfaces with different skewness and kurtosis values. From curves generated by the probability density functions or computer generated surfaces, optimum values of skewness and kurtosis are determined for minimum static and kinetic friction. By the method of the invention it is determined that a magnetic media storage device surface with a positive skewness value and a kurtosis value of at least 3 or greater substantially lowers the real area of contact, meniscus force, and sensitivity of film thickness to static friction between the magnetic media storage device and a slider head to thereby reduce friction and wear of the storage device.

Although the invention is particularly described with reference to magnetic media and the disk/head interface as an example of a types of surfaces which benefit from the low-friction and wear attributes of the invention, it is understood that the principles of the invention are applicable to all materials used for any machine component which is in moving (i.e., sliding or rolling) contact with another material such as, for example and without limitation, engine pistons, cylinders, gears, bearings, shafts, seals, etc.

These and other aspects of the invention are herein described in particularized detail with reference to the accompanying Tables and Figures.

DETAILED DESCRIPTION OF PREFERRED EMBODIMENTS AND METHODS

The invention is a low friction non-gaussian surface with a positive skewness value and a kurtosis value of at least 3 or greater and preferably as high a kurtosis value as is possible to create. A surface with these physical properties in particular is optimal to reduce static and kinetic friction in contact with another surface and thereby minimize mechanical wear from relative motion. Skewness is a surface parameter which represents a measurement of symmetry of a surface profile. In a skewed surface, the distribution gradually rises to a maximum from zero and then falls at a different rate. The difference between the mean and the mode, divided by the standard deviation, is referred to as skewness. Skewness is determined as the third moment of a probability density function of a modeled surface. Kurtosis (K) represents the peakedness (degree of pointedness or bluntness) of a surface distribution. A surface with low kurtosis has a relatively larger number of peaks than valleys at a certain height. A gaussian distribution has a skewness of zero and a kurtosis of 3. Kurtosis is measured as the fourth moment of a probability density function of a modeled surface.

Figure 1:
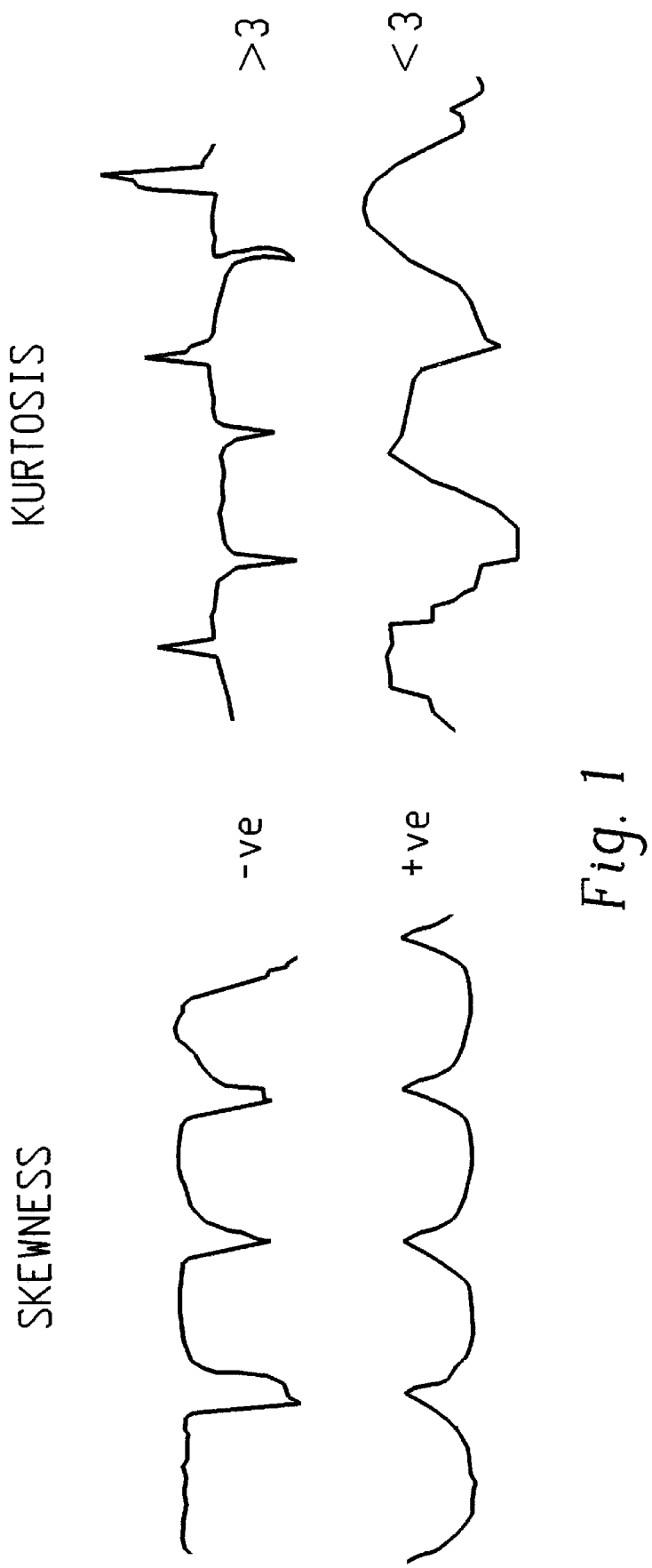
FIG. 1 schematically illustrates surfaces with various skewness and kurtosis values.

In a preferred method of the invention, probability density functions are used to statistically determine optimum surface parameters for a magnetic storage device. (Kotwal and Bhushan, unpublished). Other methods have been used by the inventor to model or represent surface parameters and resultant characteristics, such as for example by using numerical rough surface contact models and computer generated surface models. (Bhushan and Chilamakuri, unpublished). Such alternative methods of surface analysis can be used in accordance with the method of the invention of determining optimum skewness and kurtosis values which minimize friction. The probability density function for surface height defines the probability of locating a point at a height z and is denoted by p(z). The shape of the probability density function offers useful information on the behavior of the random process. This shape can be described in terms of moments of the function about the means, referred to as central moments represented by:

$$m_n = \int_{-\infty}^{\infty} (z-m)^n p(z) dz \quad (1)$$

where m is the mean height of z which is generally removed before data processing and is therefore zero. The first moment is equal to zero. The second moment $m_2$ is the variance $\sigma^2$ which is the square of the standard deviation or root-mean-square RMS value for m=0. It is a measure of the spread of the distribution and therefore of the data. The third moment $m_3$ is the skewness, a useful parameter in defining variable with an asymmetric nature. Skewness shows degree of symmetry of the profile as shown in FIG. 1. FIG. 1 represents for example a magnetic storage media, a computer hard disk surface or, equivalently, a surface of any object or any mechanical/electro-mechanical device or machine component which is placed in moving contact (e.g., sliding or rolling) with another surface. For a skewed distribution, the distribution gradually rises to a maximum from zero and then falls at a different rate. The difference between the mean and the mode divided by the standard deviation is. reterred to as skewness. If the mean is on the left hand side of the mode of the distribution, the skewness will be negative with a relatively large number of peaks than valleys at a certain height. A symmetrical distribution about the mean has zero skewness with equal number of peaks and valleys at a certain height. Typically, $m_3$ or skewness Sk is normalized as follows:

$$Sk = \frac{1}{\sigma^3} \int_{-\infty}^{\infty} (z-m)^3 p(z) dz \qquad (2)$$

where $\sigma$ is the standard deviation of p(z).

Figure 2A:
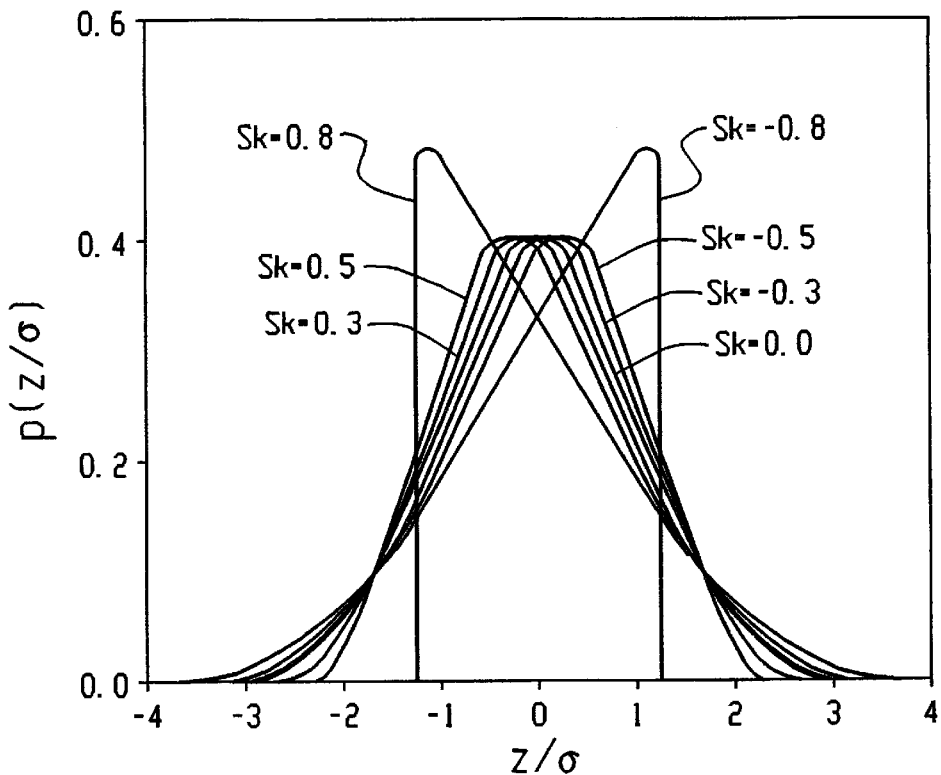
FIG. 2 graphically illustrates probability density functions for surfaces with different skewness and kurtosis values.
Figure 2B:
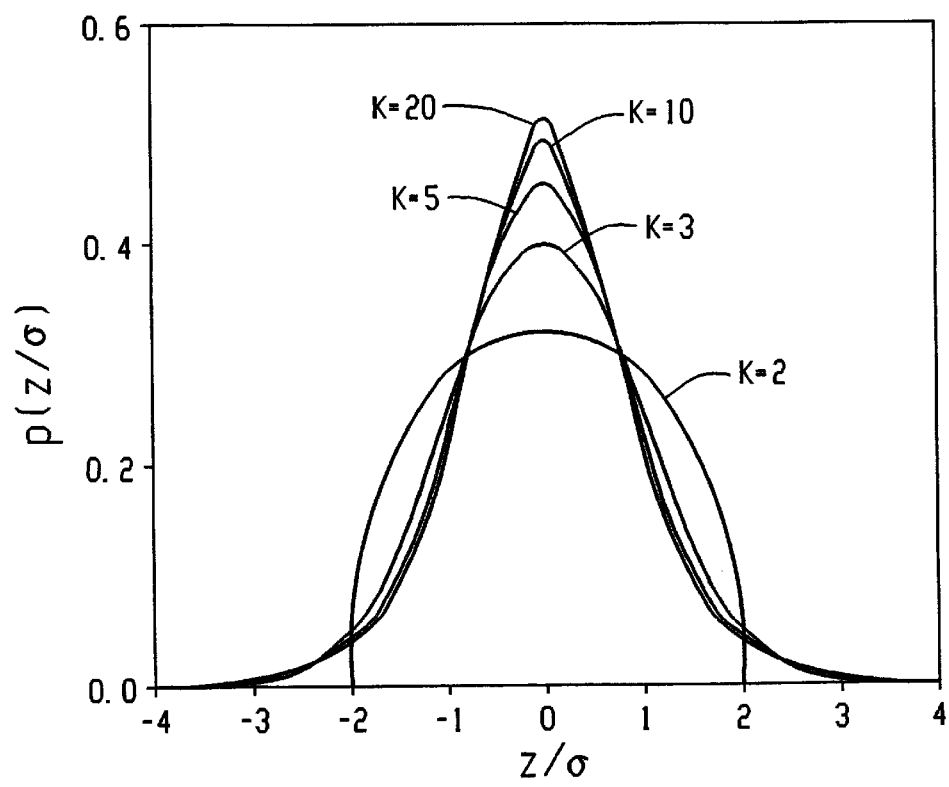
Figure 3A:
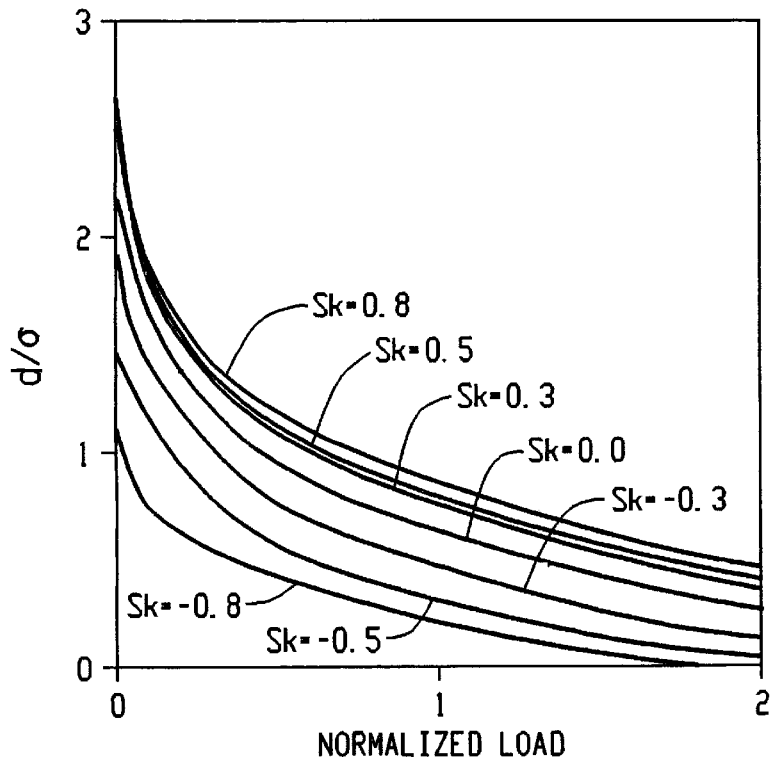
FIG. 3 graphically illustrates the effect of skewness on normalized mean separation, normalized number of contacts, normalized real area of contact, normalized mean asperity contact area and normalized mean contact pressure as a function of normalized load (K=3)
Figure 3B:
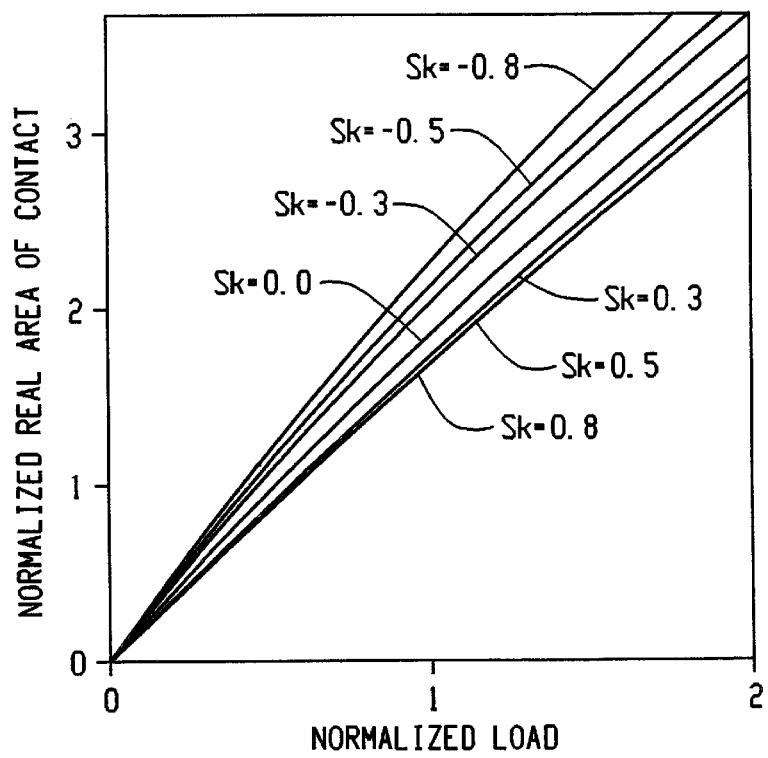
Figure 3C:
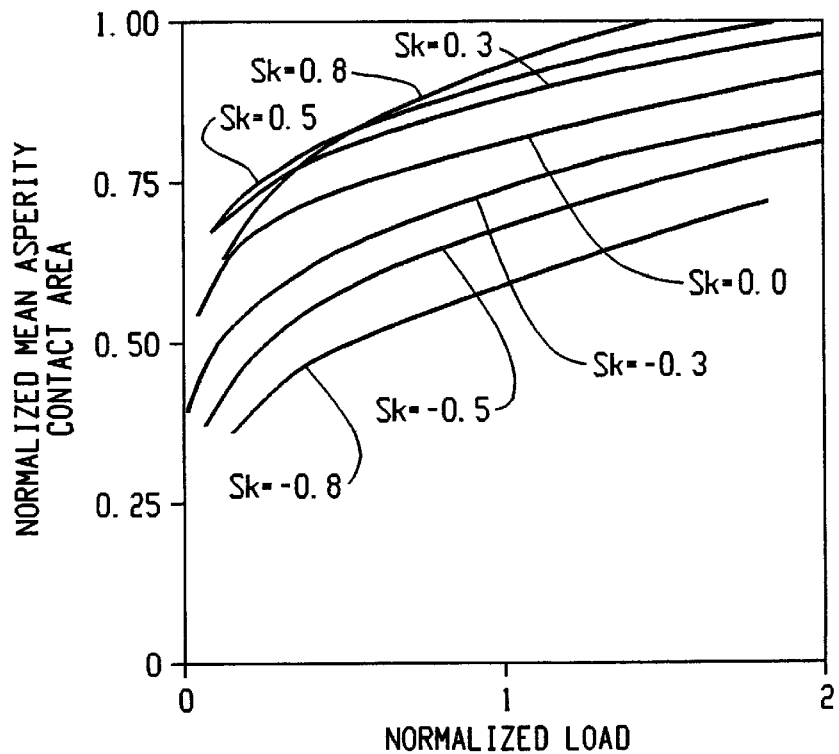
Figure 3D:
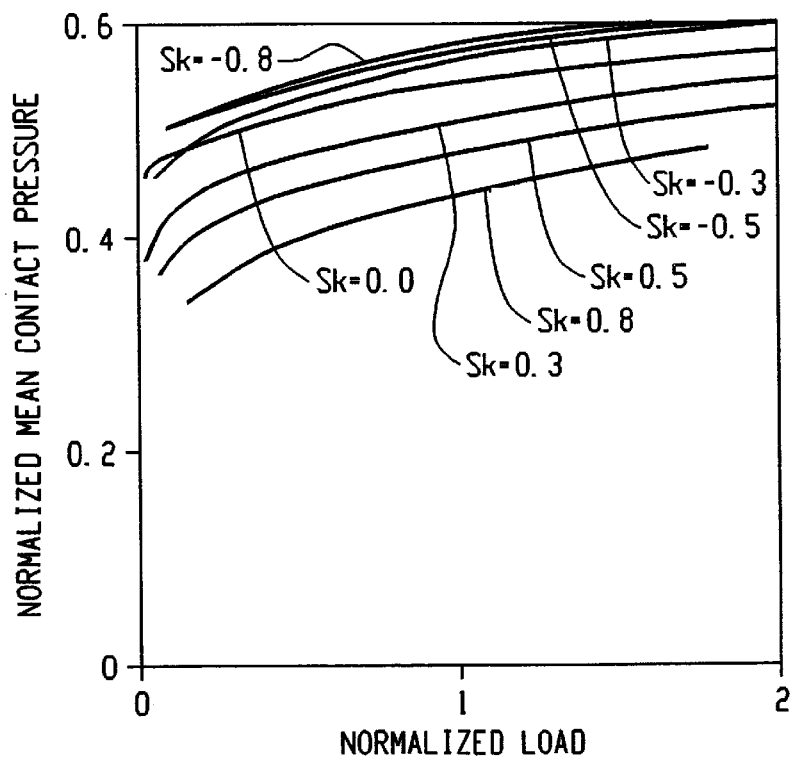
Figure 3E:
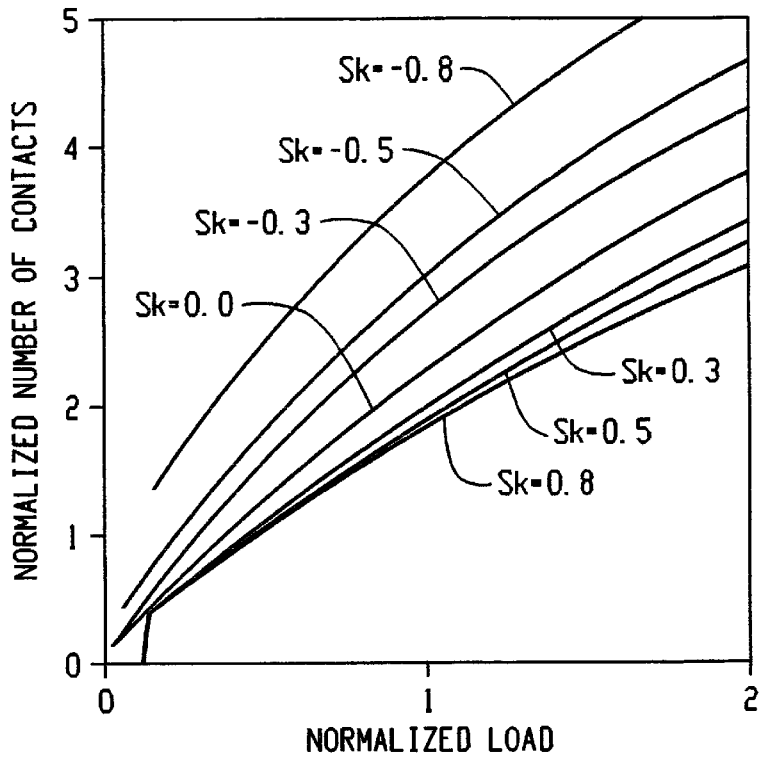
Figure 4A:
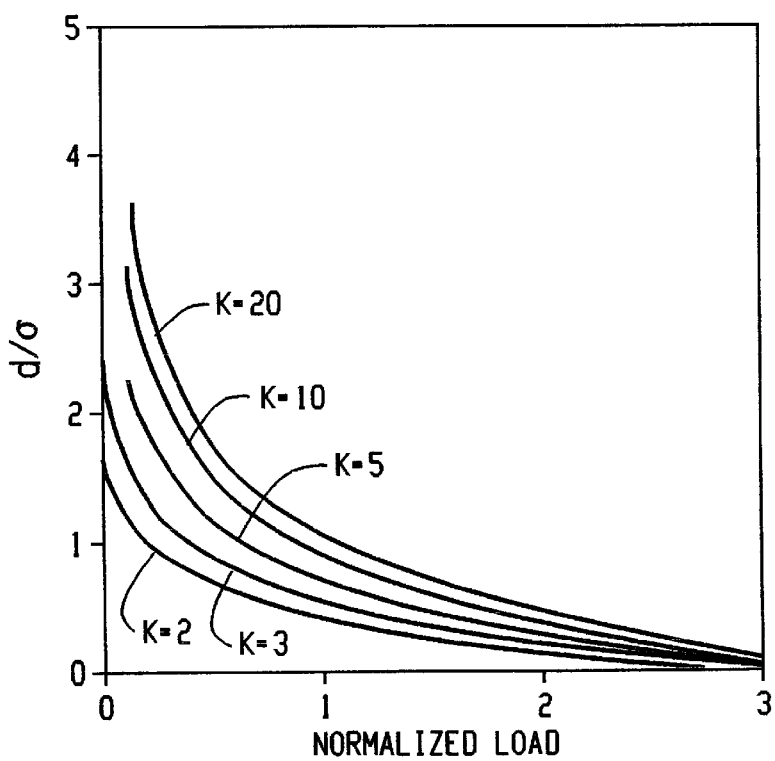
FIG. 4 graphically illustrates the effect of kurtosis on normalized mean separation, normalized number of contacts, normalized real area of contact, normalized mean contact asperity area and normalized mean contact pressure as a function of normalized load (Sk=0)
Figure 4B:
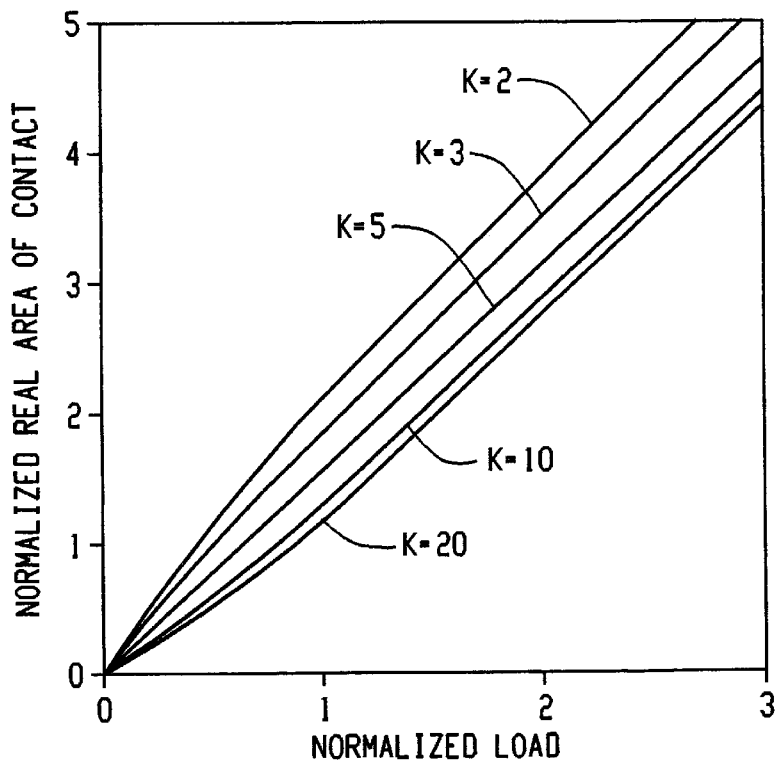
Figure 4C:
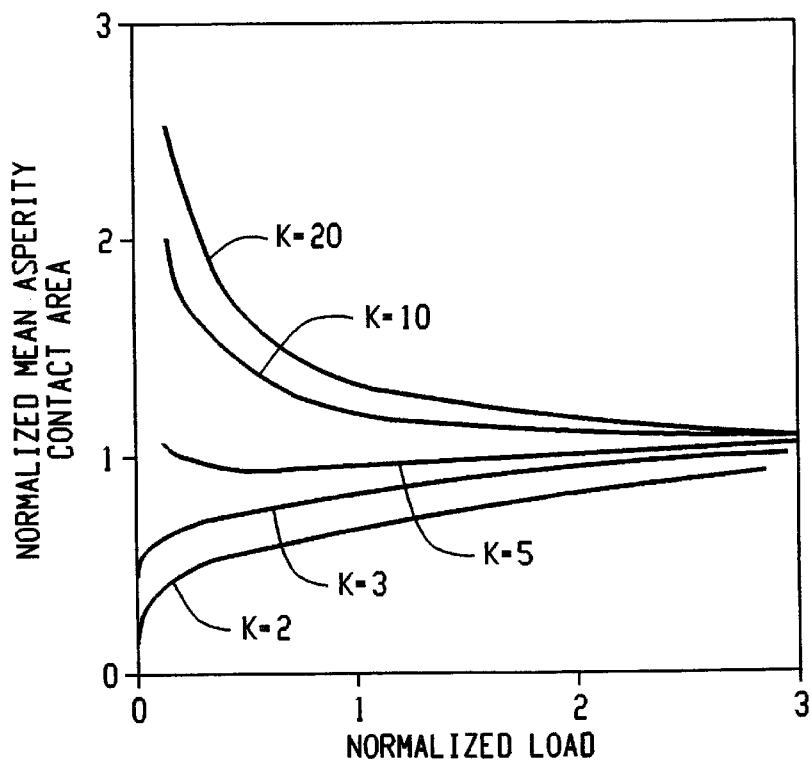
Figure 4D:
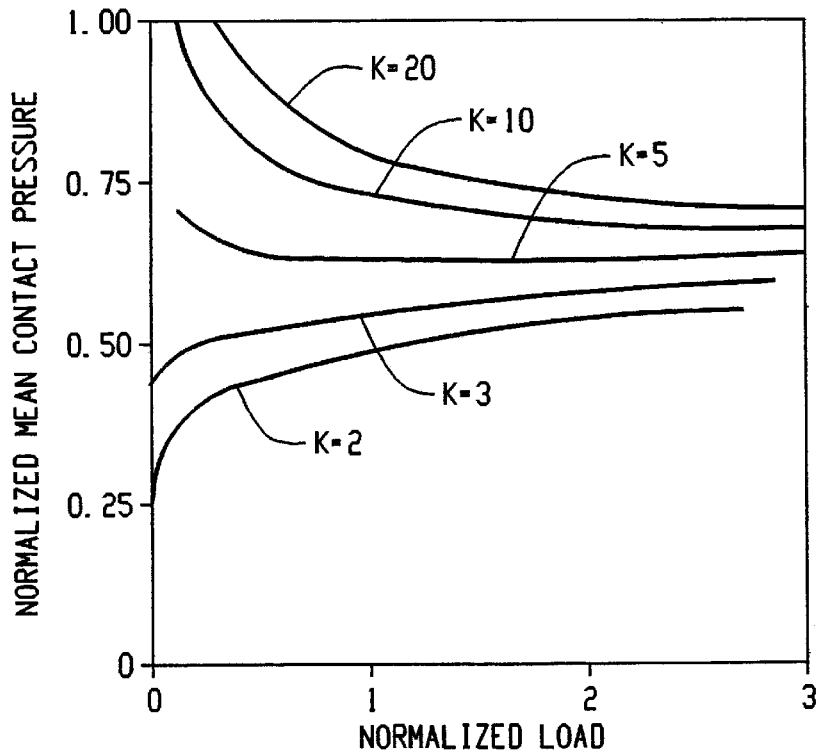
Figure 4E:
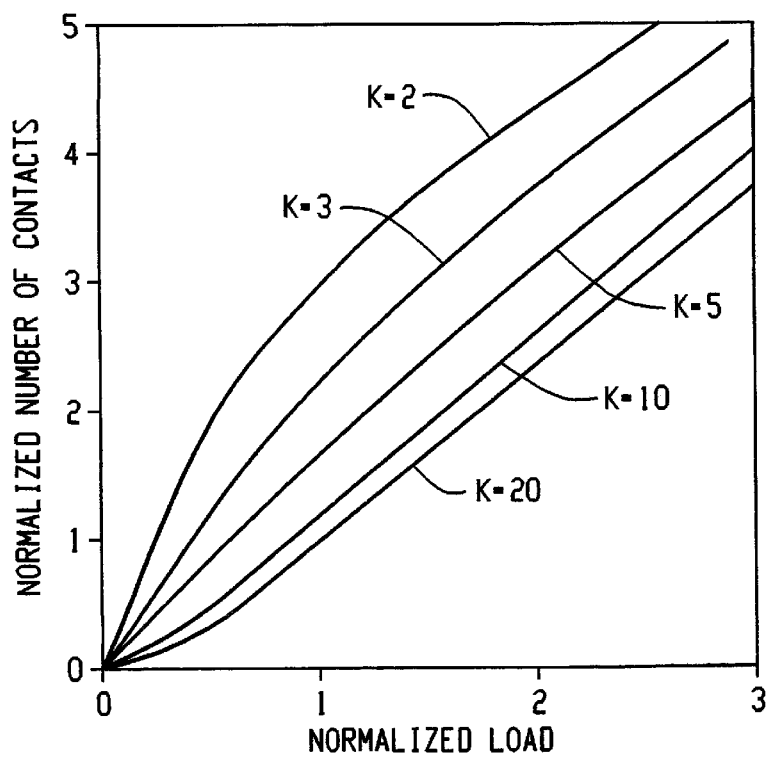
Figure 5A:
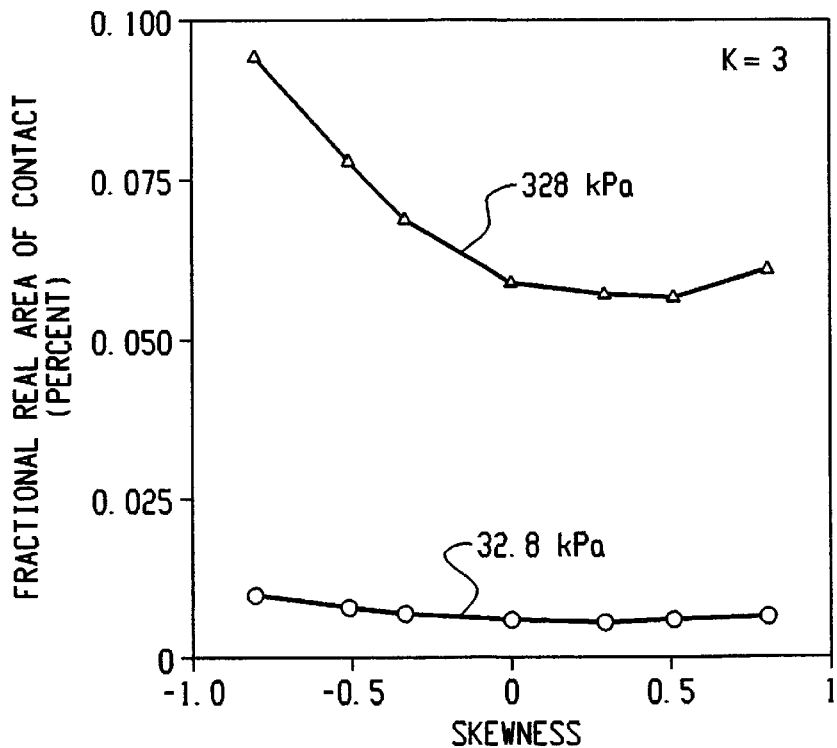
FIG. 5 graphically illustrates the effect of skewness and kurtosis on the fractional real area of contact and relative meniscus force at applied pressures of 32.8 and 328 kPa (E'=100 GPa, η=500,000/mm², Aa=0.915 mm², $\sigma_p$=1 nm, $R_p$=10 μm.
Figure 5B:
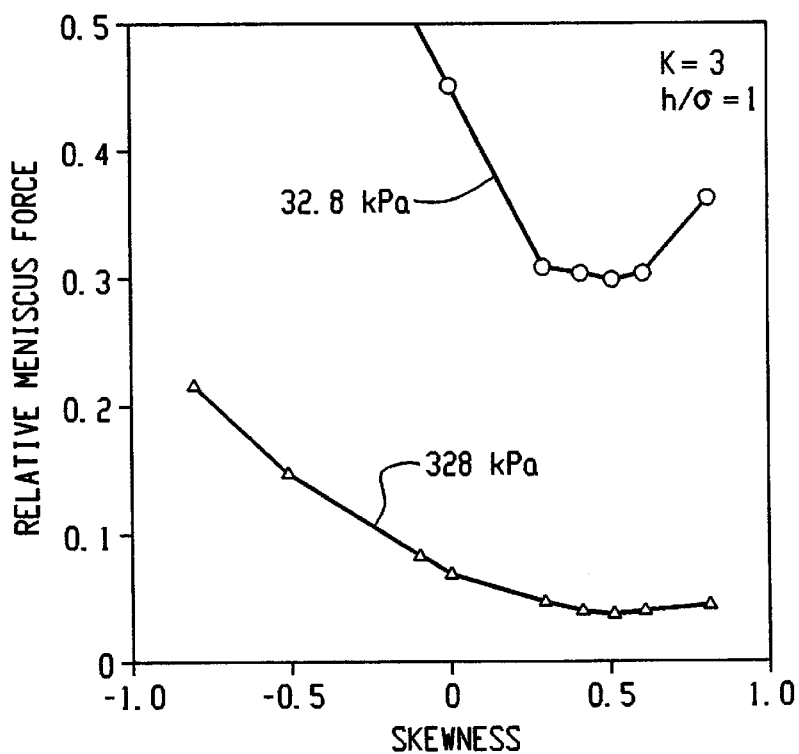
Figure 5C:
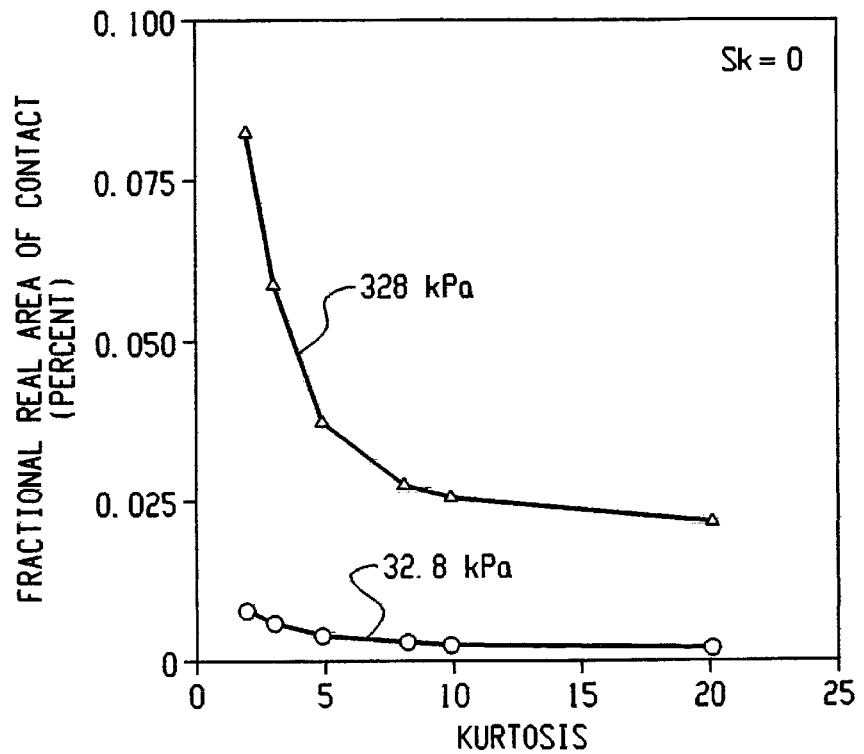
Figure 5D:
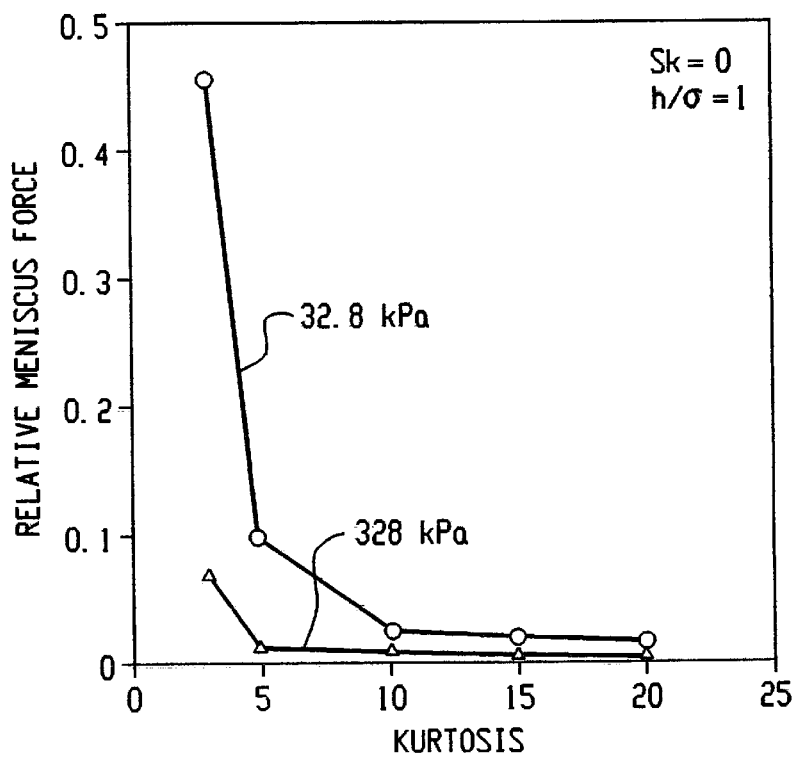

The fourth moment $m_4$ is called kurtosis and represents the peakedness (degree of pointedness or bluntness) of the distribution. A surface with low kurtosis (K) has a relatively larger number of peaks than valleys at a certain height as shown in FIG. 2. The kurtosis is normalized with respect to the standard deviation of the distribution as follows:

$$K = \frac{1}{\sigma^4} \int_{-\infty}^{\infty} (z-m)^4 p(z) dz \qquad (3)$$

For a gaussian distribution, the probability density function is given by $$p(z) = \frac{1}{\sigma\sqrt{2\pi}} \exp[-(z-m)^2/2\sigma^2] \qquad (4)$$

A gaussian distribution has a skewness of zero and a kurtosis of 3.

Most of the common machining processes produce skew distributions. (Thomas 1982). Grinding and abrasion produce negatively skewed surfaces (Sayles and Thomas 1976). Positive skewnesses are produced by certain milling and turning operations. Positive kurtosis can be produced upon surfaces by various known processes such as mechanical texturing, including free abrasive slurry and tape texturing, deposition of asperities (e.g., etching by photolithography to create asperities of equal height), laser etching, and layering of materials having differing grain sizes. The use of these and other known processes, as for example described in "Magnetic Slider/Rigid Disk Substrate materials and Disk Texturing Techniques—Status and Future Outlook", B. Bhushan, Adv. Info. Storage Syst., Vol. 5, 1993, pp. 175–209 incorporated herein by reference, is contemplated to manufacture the surfaces of the present invention.

The method of the present invention uses a probability density function for a non-gaussian surface asperity distribution in a contact model to determine real area of contact and stiction (high static friction), and to determine an optimum skewness and kurtosis for lowest real area of contact and stiction. An alternative method of the invention uses computer generated surfaces to determine optimum skewness and kurtosis values. In the preferred method of the invention as described herein, a probability density function for a non-gaussian distribution uses curve-fitting techniques including (1) the method of percentile points, (2) method of moments, and (3) method of maximum likelihood. The method of moments is ideally suited to the current study as it uses moments of the probability density function to determine the curve fitting parameters. As the skewness and kurtosis are the third and fourth moments of the probability density function, the curve fitting parameters can be determined in terms of the skewness and the kurtosis. Once the probability density function is determined, a contact model can be developed using the Greenwood and Williamson (1966) approach, incorporated herein by reference.

In this particular method of the invention, it is required that a probability density function be generated for a distribution having a known mean, standard deviation, skewness and kurtosis. The method of moments can be used in such a situation. The Pearson system of frequency curves, based on the method of moments, provides a family of curves which can be used to generate an equation for a distribution for which the first four moments are known (Elderton and Johnson, 1969). Pearson defined a criterion $\kappa$, given by $$\kappa = \frac{Sk^2(K+3)^2}{4(2K - 3Sk^2 - 6)(4K - 3Sk^2)} \qquad (5)$$

The value of $\kappa$ determines a type of the curve. Depending on the value of $\kappa$, different equations can be obtained for the probability density functions. A list of the different types of curves, their equations and the range of K for which they are applicable is shown in Table I. There are three main types of Pearson curves which cover the majority of the cases. These are Types I, IV, and VI. This really covers the whole field, but in the limiting cases when one type changes into another, we reach simpler forms of transition curves. Analytical expressions have been derived for the curve fitting parameters in terms of the standard deviation, skewness and kurtosis of the distribution, see Appendix A (Elderton and Johnson, 1969). The expressions for the parameters for the different types of curves are presented in Appendix A. Based on these expressions a software program was developed to determine the equation and type of curve for a given set of parameters and details for selected skewness and kurtosis values presented in Table II. The probability density function curves generated by this method for different skewness and kurtosis values are s;shown in FIG. 2. From FIG. 2, it can be seen that a gaussian surface with zero skewness and kurtosis of 3 has an equal number of peaks and valleys at a certain height. A surface with a high negative skewness has a large number of peaks, whereas a surface with a high positive skewness consists of few peaks. A surface with a low kurtosis has a relatively large number of peaks as compared to that of a surface with a high kurtosis.

Non-gaussian probability density functions obtained in this manner are substituted in the classical Greenwood and Williamson model. In this model, it is assumed that all asperities have the same radius $R_p$ and their heights follow a non-gaussian distribution p(z). This model gives expressions for the real area of contact, the normal load and the number of contact spots in terms of the statistical parameters of the distribution. The probability that a particular asperity has a height between z and z+dz above some reference plane will be p(z)dz. The expected number of contact spots are given by $$n = N \int_d^\infty p(z) dz \qquad (6)$$

where d is the separation between mean planes of the two surfaces, p(z) is the probability density function of the equivalent surface ind N is the total number of asperities. The total load is given by $$W = \frac{4}{3}NE'R_p^{0.5} \int_d^\infty (z-d)^{3/2} p(z)dz \qquad (7)$$

where W is the total load, E' is the equivalent Young's modulus of elasticity given by $$\frac{1}{E'} = \frac{1-v_1^2}{E_1} + \frac{1-v_2^2}{E_2} \qquad (8)$$

where $E_1$ and $E_2$ are the Young's moduli of elasticity for the two surfaces and $v_1$ and $v_2$ are the Poisson's ratios of the mating surfaces and $R_p$ is the equivalent radius of the peak asperities given by $$\frac{1}{R_p} = \frac{1}{R_{p1}} + \frac{1}{R_{p2}} \qquad (9)$$

where $R_{p1}$ and $R_{p2}$ are the mean radii of the peaks on the two surfaces. The real area of contact $A_2$ is given by $$A_r = \pi N R_p \int_d^\infty (z-d) p(z)dz \qquad (10)$$

It is convenient to use standardized variables, and describe heights in terms of the equivalent standard deviation of the peak asperities, $\sigma_p$, of the two surfaces given by $$\sigma_p = (\sigma_{p1}^2 + \sigma_{p2}^2)^{1/2} \qquad (11)$$

The surface density of asperities $\eta$, is defined to be $$\eta = N/A_a \qquad (12)$$

where $A_a$ is the nominal contact area. Then Eqs. (6) (7) and (10) reduce to $$n = \eta A_a F_0(h) \qquad (13)$$

$$W = \frac{4}{3}\eta A_a E' R_p^{0.5} \sigma_p^{1.5} F_{1.5}(h) \qquad (14)$$

$$A_r = \pi \eta A_a R_p \sigma_p F_1(h) \qquad (15)$$

where it is the standardized separation given by d/σ and $$F_n(h) = \int_h^\infty (s-h)^n p^*(s)ds \qquad (16)$$

where p*(s), the standardized height distribution, is the height distribution scaled to make its standard deviation unity.

In addition to the analysis of the real area of contact, it is necessary to obtain values for the meniscus force for the different p.d.f.'s. A model is proposed by Gao et al. (1995) is used to determine the meniscus force. According to this model, the meniscus force is given by $$F_m = 2\pi R_p \gamma (1+\cos\theta) \int_{d-h}^\infty p(z)dz \qquad (17)$$

where $F_m$ is the meniscus force of a lubricating layer between two surfaces, γ is the surface tension of the lubricating liquid layer, θ is the contact angle and h is the lubricant film thickness. The interplanar separation of d is determined from $$W + F_m = \frac{4}{3}E' R_p^{1/2} N \int_d^\infty (z-d)^{3/2} p(z)dz \qquad (18)$$

An iterative numeral approach is used to solve Eq. (17) and (18).

Different p.d.f.'s are substituted in these equations, corresponding to different skewness and kurtosis to obtain values for the real area of contact and the meniscus force.

Using the contact model described in the preceding section, curves were plotted showing the variation of the normalized mean separation (d/σ), the normalized number of contacts, the normalized area, the normalized mean asperity contact and normalized mean contact pressure. The normalized load is the term $$\left\{ \frac{W}{\eta A_a E' R_p^{0.5} \sigma_p^{1.5}} \right\} \qquad (19)$$

which is obtained from Eq. (14); the normalized number of contacts is the term $$\left\{ \frac{n}{\eta A_a} \right\} \qquad (20)$$

which is obtained from Eq. (13) and the normalized real area of contact is the term $$\left\{ \frac{A_r}{\pi \eta A_a R_p \sigma_p} \right\} \qquad (21)$$

which is derived from Eq. (15). The normalized mean asperity contact area is the ratio of the normalized real area of contact and the normalized number of contacts. Finally the normalized mean contact pressure is the ratio of the normalized load and the normalized real area of contact.

Curves showing the variation of the just mentioned parameters for probability distribution functions having different skewnesses are shown in FIG. 3. The kurtosis for the probability density functions (henceforth referred to as p.d.f.'s) is 3. From these curves it is observed that the p.d.f.'s with a negative value of skewness exhibit the highest real area of contact and the highest number of contacts; the more negative the skewness the higher the value of these contact parameters. At high loads, the p.d.f.'s having a high positive skewness exhibit the minimum real area of contact and the number of contacts. The higher the load, the more pronounced the difference between the various p.d.f.'s. At lower loads (normalized load<1) the behavior is slightly different. The real area of contact and the normalized load show very little variation for zero and positive value of skewness. Moreover, even if such a variation is present, the scale on the vertical axis is too small to detect it. To obtain trends for the contact parameters at low loads, it is necessary to obtain actual value for a given applied load.

The normalized real area of contact varies linearly with the load at all values of skewness. The slope of the line is higher for negative skewness than for positive skewness. The normalized mean asperity contact area is lower for negative values of skewness than for positive values and increases with an increase in load. This is due to the rapid increase in the normalized number of contacts as compared with the normalized real area of contact for the negative skewness, resulting in a lower average asperity contact area. The mean contact pressure increases with an increase in applied load. However, the increase is negligible as compared with the increase in the load, so that it can be assumed that the mean contact pressure is constant. The mean contact pressure increases with an increase in skewness, being the least for the surface with negative skewness and increasing to a maximum for the surface having the highest positive skewness.

FIG. 4 shows the variation of the contact parameters at different kurtosis, with the skewness of the p.d.f.'s being zero. It is seen that the normalized real area of contact and the normalized number of contacts are lower for p.d.f.'s with a higher kurtosis. This behavior is monotonic at all loads. Again, the real area of contact varies linearly with the load, with the p.d.f.'s having a lower kurtosis exhibiting a higher slope for the curve. The normalized average asperity area shows different trends for different kurtosis. For a kurtosis below 5, it increases with an increase in load; it is independent of load at a kurtosis of 5, while for a kurtosis above 5, it decreases with an increase in load. This variation can be deduced by observing that the curve between the normalized number of contacts and the normalized load is convex for a kurtosis below 5, linear at 5, and concave for a kurtosis above 5, which accounts for the contrasting trends exhibited by the normalized average asperity area. The variation of the mean contact pressure follows a similar trend. The mean contact pressure seems to be independent of load to a fairly large extent, for all values of skewness and kurtosis.

The results in the preceding paragraph are valid provided that the contact is elastic. For the application of the model to a head-disk interface of a magnetic storage device such as computer hard disk, it is necessary to assume values for E', H, η, $\sigma_p$ and $R_p$. We consider a nanoslider (pad area $A_a$=0.915 mm²) against a supersmooth thin-film disk at a nominal load (W) of 3 g. Typical values of E'=100 GPa, H=7 GPa, W/$A_a$=$p_a$=32.8 kPa, η=500,000/mm², $\sigma_p$=1 nm (peak height standard deviation) and $R_p$=10 μm (radius of curvature of peak asperities) are used in the analysis. The plasticity index, ψ, is used to determine whether the contact is elastic. The plasticity index is given by (Greenwood and Williamson, 1966)

$$\psi = \frac{E'}{H}\left(\frac{\sigma_p}{R_p}\right)^{1/2} \quad (22)$$

A plasticity index below 0.6 indicates an elastic contact. Using the values of the parameters mentioned earlier, the value of ψ is 0.14. Thus, the analysis carried out earlier for elastic contacts is valid. The standard deviation of peak heights of magnetic storage disk surfaces ranges from approximately 1 nm to 5 nm.

FIG. 5 shows the variation of the fractional real area of contact (real area of contact divided by apparent area of contact) with the skewness and the kurtosis, using the previously mentioned parameters. To study the effect of load, calculations at a normal pressure of 328 kPa are also made. It is seen that the fractional real area is high for a negative skewness and decreases with an increase in skewness up to a positive skewness of 0.3 for $p_a$=32.8 kPa, after which it increases again. So a skewness of 0.3 represents an optimum for the applied pressure of 32.8 kPa. The variation of the real area of contact with the kurtosis is continuous, with the higher values of kurtosis resulting in a lower real area of contact. So the highest possible value of kurtosis should be selected in order to minimize the real area of contact. For the higher pressure of 328 kPa, the trend is similar. The optimum value of the skewness is 0.6 for this pressure. The variation of the real area of contact with the kurtosis is similar to that observed at the lower pressure.

FIG. 5 also shows the variation of the relative meniscus force ($F_m$/W) at the two applied pressures with the skewness and the kurtosis for h/σ=1, where h is the total liquid film thickness. The surface tension of the selected perfluropolyether lubricant, γ, is used is 25 g/cm and the contact angle, θ, is 10 degrees. The trend is more or less similar to the trend exhibited by the real area of contact. The only difference is that the minimum meniscus force occurs at a skewness of 0.5 (in comparison to 0.3 for the real area of contact) at an applied pressure of 32.8 kPa. For $p_a$=328 kPa, the optimum value of the skewness is 0.7. The relative meniscus force decreases with an increase in the kurtosis for both the applied pressures. It is thus observed that a small positive skewness and a high kurtosis provide an optimization to the surface in order to obtain a minimum real area of contact and meniscus force.

Figure 6A:
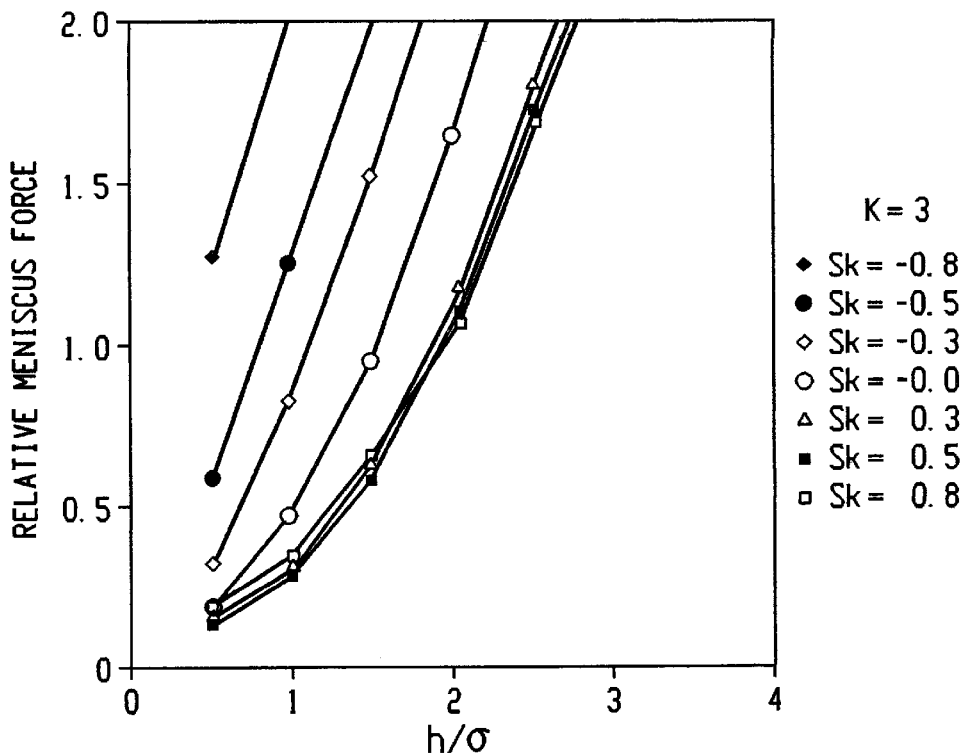
FIG. 6 graphically illustrates the relative meniscus force as a function of h/σ for different skewness and kurtosis values at an applied pressure of 32.8 kPa (E'=100 GPa, η=500,000/mm², $A_a$=0.915 mm², $\sigma_p$=1 nm, $R_p$=10 μm) and, FIG. 7 graphically illustrates the interplay of the skewness and kurtosis on the fractional real area of contact and relative meniscus force at an applied pressure of 32.8 kPa(E'=100 GPa, η=500,000/mm², $A_a$=0.915 mm², $\sigma_p$=1 nm, $R_p$=10 μm).
Figure 6B:
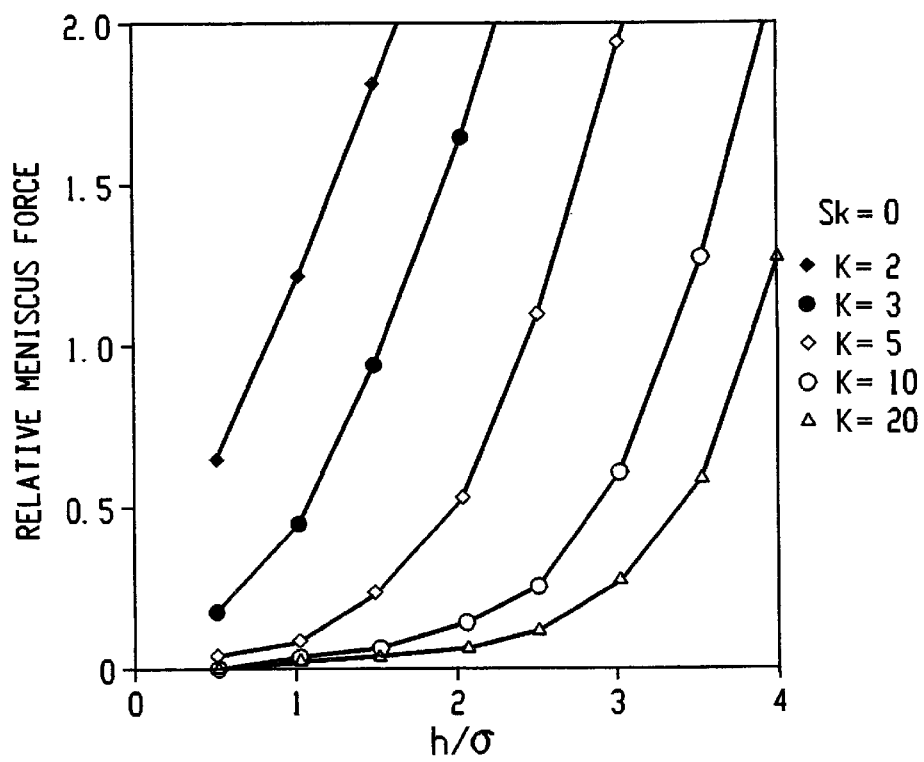
Figure 7A:
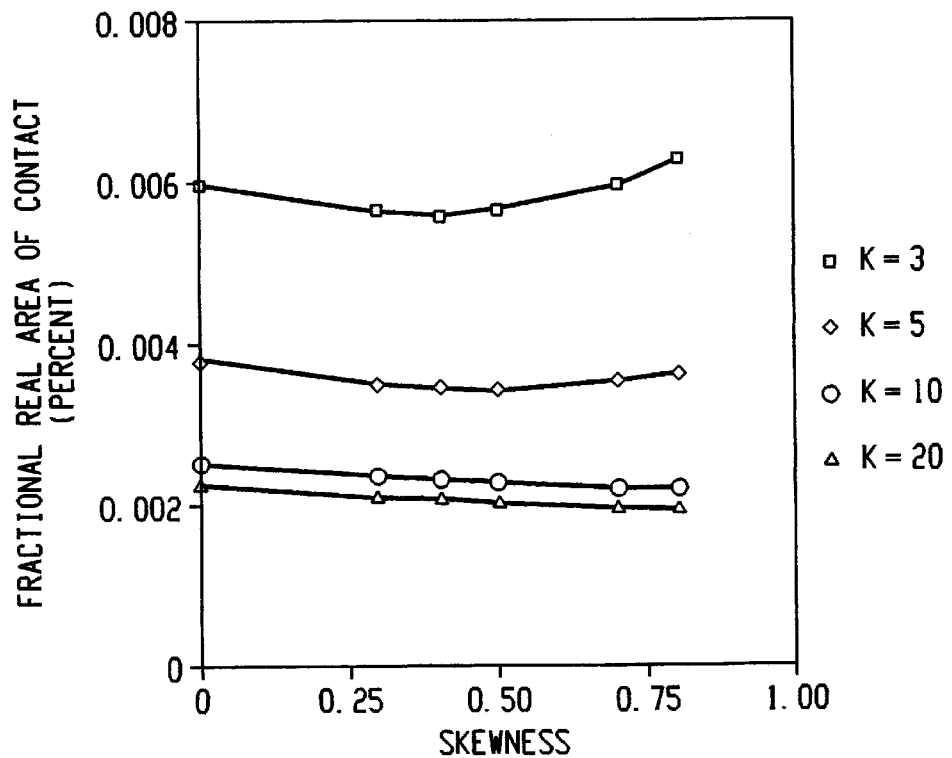
Figure 7B:
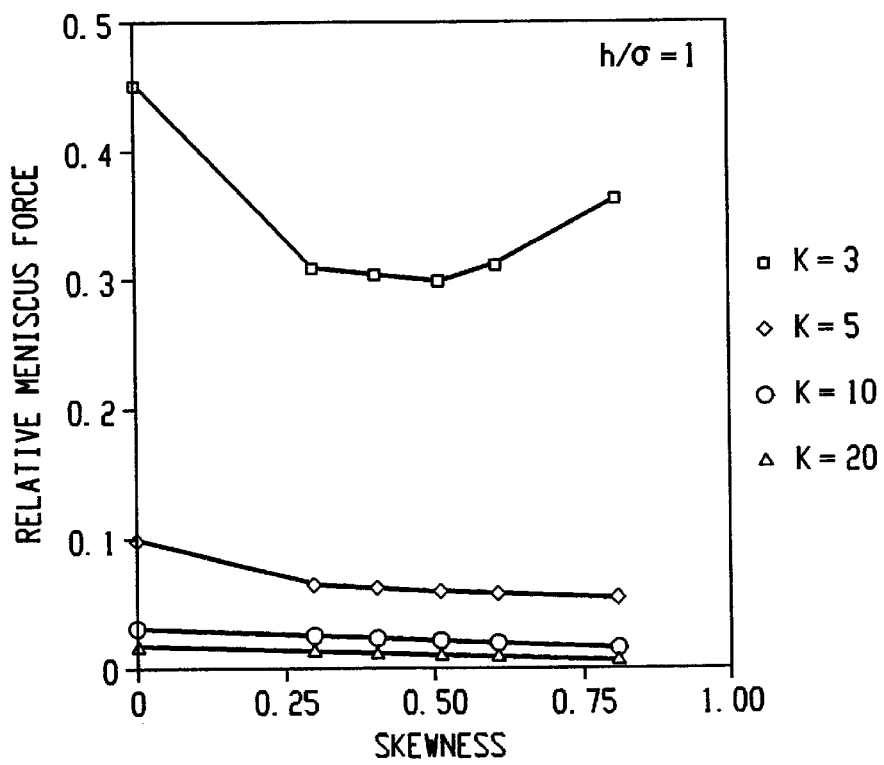
Figure 7C:
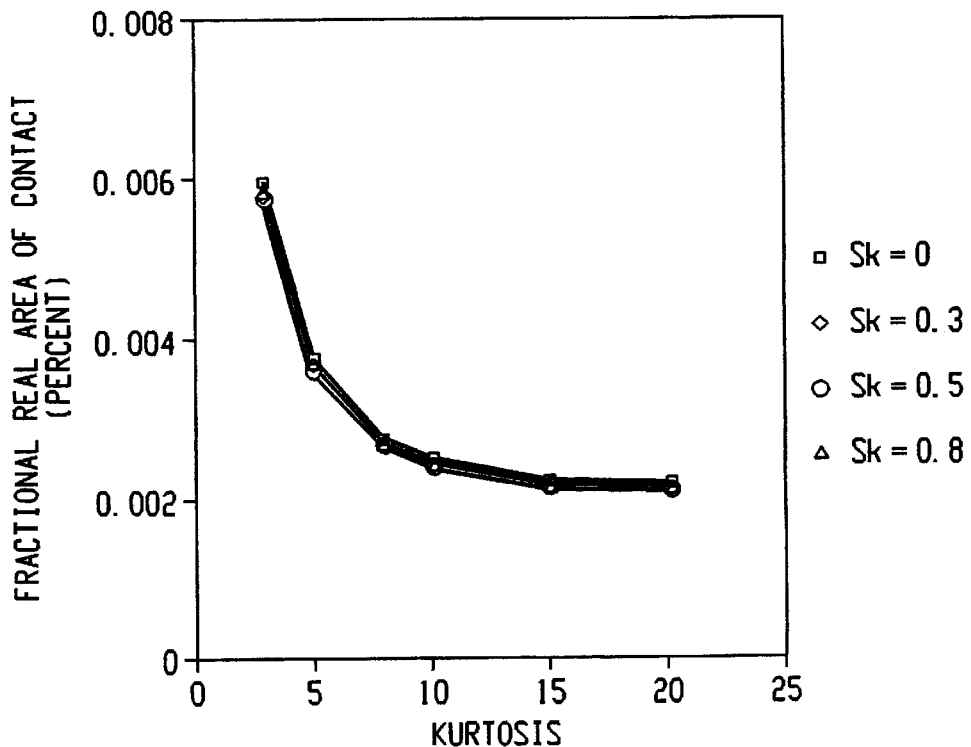
Figure 7D:
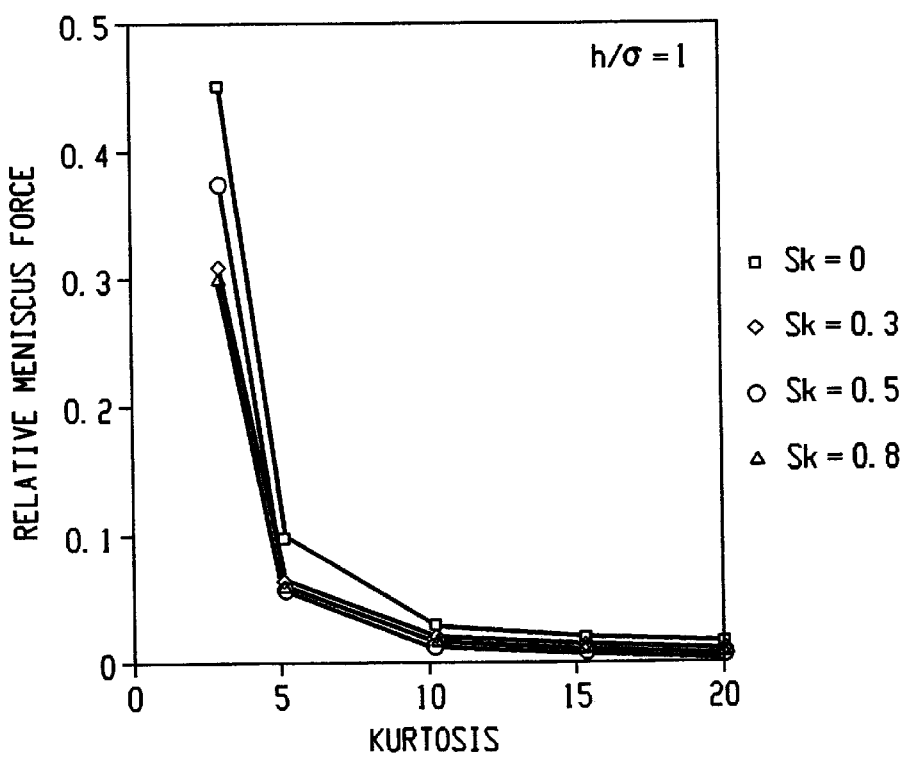

FIG. 6 shows the meniscus force for different values of h/σ. For a gaussian distribution, the critical value of h/σ resulting in a high meniscus force is around half. A higher value implies that a thicker liquid film can be applied to the disk. For a negative skewness, the value is lower, while for a positive value, this value is higher. However, the effect of the positive skewness on the critical h/σ is not as significant as the effect of the kurtosis. With a kurtosis of 20, the critical value is 2.5, which is five times as high as that of a gaussian distribution. Thus, a high kurtosis should be selected in order that a thicker lubricant layer be applied to the disk for minimum wear.

FIG. 7 shows the interplay of the skewness and the kurtosis on the real area of contact and the relative meniscus force. It is seen that the real area of contact is minimum at a skewness of 0.3, for a kurtosis of 3. However, as the kurtosis increases to 5, this minimum value occurs at a skewness of 0.5. For higher kurtosis, the minimum is at 0.8. This shows that the optimum value of the skewness shifts to the right along the horizontal axis as the kurtosis increases. The effect of the higher kurtosis is significant as it results in a sharp drop in the real area of contact. However, from FIG. 7, it is seen that a change in skewness does not result in a significant change in the real area of contact, especially at higher kurtosis. FIG. 7 also shows the variation of the meniscus force with kurtosis for various skewness values. The trends are similar to the ones exhibited by the real area of contact mentioned.

The invention is applicable to any type of surface where reduction of static or kinetic friction and wear is desired. This includes, without limitation, any objects or parts which are or can be placed in moving (sliding or rolling) contact such as, for example, machine components, bearings and bearing surfaces, pistons, piston rings, cylinders, seals, clutches, etc.

In one particular embodiment, the invention provides a magnetic media storage device with an optimal surface for reducing friction and wear and a method of design which uses a head-disk interface contact model in non-gaussian probability functions to identify optimum values of skewness and kurtosis of the surface for different loads and meniscus forces. For a given kurtosis, there is an optimum value of skewness. This optimum value depends on the actual value of the kurtosis. For a kurtosis of 3, the optimum value in skewness resulting in the minimum real area of contact is 0.3, while the optimum skewness value resulting in the minimum relative meniscus force is 0.5. For a higher value of kurtosis, optimum skewness value is 0.6 or greater. For a given skewness, the higher the kurtosis, the lower the value of the contact parameters. The sensitivity of the relative meniscus force to the film thickness reduces with an increase in the kurtosis. A positive skewness results in a higher value of the critical film thickness. Therefore, in accordance with the invention it is desirable that a magnetic media storage device have a surface which has a positive skewness and as high a kurtosis as possible.

Appendix A Probability Density Functions for Nongaussian Distribution

Equations for probability density functions for different types of curves (PeArson's type of curves) are presented in Table I. The parameters in the curves for the non gaussian probability density functions are functions of the standard deviation, skewness and the kurtosis. This appendix presents the equations for the parameters of the different types of curves.

First Main Type (Type I)

The equation for the probability density function (p.d.f.) is given by $$p(z) = y_e (1 + z/A_1)^{m_1} (1 - z/A_2)^{m_2} \quad (-A_1 < z < A_2) \tag{A.1}$$

where $$(m_1 + 1)/A_1 = (m_2 + 1)/A_2 \tag{A.2}$$

The values to be calculated in order are $$A_1 + A_2 = \frac{\sigma}{2}\left(Sk^2(r+2)^2 + 16(r+1)\right)^{1/2} \text{ where} \tag{A.3}$$

$$r = \frac{6(K - Sk^2 - 1)}{(6 + 3Sk^2 - 2K)} \tag{A.4}$$

The m's are given by $$\frac{1}{2}\left(r - 2 \pm r(r+2)\left(\frac{Sk^2}{Sk^2(r+2)^2 + 16(r+1)}\right)^{1/2}\right) \tag{A.5}$$

(when Sk is positive, $m_2$ is the positive root) and $$y_e = \tag{A.6}$$

$$\frac{1}{A_1 + A_2} \frac{(m_1+1)^{m_1}(m_2+1)^{m_2}}{(m_1+m_2+2)^{m_1+m_2}} \left[\frac{(m_1+m_2+2)}{\Gamma(m_1+1)\Gamma(m_2+1)}\right] \text{ where}$$

$$\Gamma(p) = \int_0^\infty e^{-x} x^{p-1} dx \tag{A.7}$$

Second Main Type (Type IV)

The equation for the p.d.f. is given by $$p(z) = y_0 [1 + (z/a - v/r)^2]^{-m_e - v \tan^{-1}(z/a - v/r)} \tag{A.8}$$

The values to be calculated in order are $$m_e = 0.5(r+2) \text{ where} \tag{A.9}$$

$$r = \frac{6(K - Sk^2 - 1)}{2K - 3Sk^2 - 6} \tag{A.10}$$

$$v = \frac{-r(r-2)Sk}{(16(r-1) - Sk^2(r-2)^2)^{1/2}} \tag{A.11}$$

$$a = \frac{\sigma}{4}\left(16(r-1) - Sk^2(r-2)^2\right)^{1/2} \text{ and} \tag{A.12}$$

$$y_0 = \frac{1}{aF(r, v)} \text{ where} \tag{A.13}$$

$$F(r, v) = e - \frac{v\pi}{2} \int_0^\pi \sin^r \phi e^{v\phi} d\phi \tag{A.14}$$

Third Main Type (Type VI)

The equation for the p.d.f. is given by $$p(z) = y_e (1 + z/A_1)^{(-q_1)} (1 + z/A_2)^{q_2} \tag{A.15}$$

The values to be calculated in order are $$a = \frac{\sigma}{2}\left(Sk^2(r+2)^2 + 16(r+1)\right)^{1/2} \text{ where} \tag{A.16}$$

$$r = \frac{6(K - Sk^2 - 1)}{6 + 3Sk^2 - 2K} \tag{A.17}$$

$q_2$ and $-q_1$ are positive and negative roots respectively of the following equation $$\frac{r-2}{2} \pm \frac{r(r+2)}{2}\left(\frac{Sk^2}{Sk^2(r+2)^2 + 16(r+1)}\right)^{1/2} \tag{A.18}$$

$A_1$ and $A_2$ are given by $$A_1 = \frac{a(q_1 - 1)}{(q_1 - 1) - (q_2 + 1)}, \quad A_2 = \frac{a(q_2 + 1)}{(q_1 - 1) = (q_2 + 1)} \text{ and} \tag{A.19}$$

$$y_e = \frac{(q_2 + 1)^{q_2}(q_1 - q_2 - 2)^{q_1 - q_2}\Gamma(q_1)}{a(q_1 - 1)^{q_1}\Gamma(q_1 - q_2 - 1)\Gamma(q_2 + 1)} \tag{A.20}$$

Normal Curve

The equation p(z) for the p.d.f. is $$p(z) = y_0 \exp(-z^2/2\sigma^2) \tag{A.21}$$

where $$y_0 = \frac{1}{\sigma\sqrt{2\pi}} \tag{A.22}$$

Transition Type (Type II)

The equation p(z) for the p.d.f. is $$p(z) = y_0 (1 - z^2/a^2)^m \tag{A.23}$$

where $$m = \frac{5K - 9}{2(3 - K)} \tag{A.24}$$

$$a^2 = \frac{2\sigma^2 K}{3 - K} \text{ and} \tag{A.25}$$

$$y_0 = \frac{1}{a\sqrt{\pi}} \frac{\Gamma(m + 3/2)}{\Gamma(m)} \tag{A.26}$$

Transition Type (Type VII)

The equation p(z) of the curve is $$p(z) = y_0 (1 + z^2/a^2)^{-m} \tag{A.27}$$

where $$m = \frac{5K - 9}{2(K - 3)} \tag{A.28}$$

$$a^2 = \frac{2\sigma^2 K}{K - 3} \text{ and} \tag{A.29}$$

$$y_0 = \frac{1}{a\sqrt{\pi}} \frac{\Gamma(m)}{\Gamma\left(m - \frac{1}{2}\right)} \tag{A.30}$$

TABLE I

Equations for probability density functions
(Elderton and Johnson, 1969)

| No. of type usually adopted | Equation with origin at mean | Criterion |
|---|---|---|
| MAIN TYPES | | |
| I | $p(z) = y_e(1+z/A_1)^{m_1}(1-z/A_2)^{m_2}$ | $\kappa$ negative |
| II | $p(z) = y_0[1+(z/a-v/r)^2]^{-m} e^{-v\tan^{-1}(z/a-v/r)}$ | $\kappa > 0$ & $\kappa < 1$ |
| VI | $p(z) = y_e(1+z/A_1)^{(-q_1)}(1+z/A_2)^{q_2}$ | $\kappa > 1$ |
| TRANSITION TYPES | | |
| Normal Curve | $p(z) = y_0 \exp(-z^2/2\sigma^2)$ | $\kappa = 0$, Sk = 0, K = 3 |
| II | $p(z) = y_0(1-z^2/a^2)^m$ | $\kappa = 0$, Sk = 0, K < 3 |
| VII | $p(z) = y_0(1+z^2/a^2)^{-m}$ | $\kappa = 0$, Sk = 0, K > 3 |

Equations for curve fitting parameters are presented in Appendix A

TABLE II

Probability density functions for surfaces with
various skewness and kurtosis
values based on the Pearson's system of frequency curves

| Non Gaussian Parameters | | | Number | |
|---|---|---|---|---|
| Sk | K | $\kappa$ | of type | Probability density function, p(z*) |
| −0.8 | 3 | −0.298 | I | $p(z^*) = 0.33(1+z^*/3.86)^{2.14}(1-z^*/1.36)^{0.11}$ |
| −0.5 | 3 | −0.267 | I | $p(z^*) = 0.38(1+z^*/6.36)^{9.21}(1-z^*/2.36)^{2.79}$ |
| −0.3 | 3 | −0.255 | I | $p(z^*) = 0.39(1+z^*/10.72)^{29.80}(1-z^*/4.05)^{10.64}$ |
| 0.0 | 3 | 0.000 | Normal | $p(z^*) = 0.3989\exp(-0.5(z^*)^2)$ |
| 0.3 | 3 | −0.255 | I | $p(z^*) = 0.39(1+z^*/4.05)^{10.64}(1-z^*/10.72)^{29.80}$ |
| 0.5 | 3 | −0.267 | I | $p(z^*) = 0.38(1+z^*/2.36)^{2.79}(1-z^*/6.36)^{9.21}$ |
| 0.8 | 3 | −0.297 | I | $p(z^*) = 0.33(1+z^*/1.36)^{0.11}(1-z^*/3.86)^{2.14}$ |
| 0.0 | 2 | 0.000 | II | $p(z^*) = 0.32(1-(z^*)^2/16)^{0.5}$ |
| 0.0 | 3 | 0.000 | Normal | $p(z^*) = 0.3989\exp(-0.5(z^*)^2)$ |
| 0.0 | 5 | 0.000 | VII | $p(z^*) = 0.46(1+(z^*)^2/25)^{-4}$ |
| 0.0 | 10 | 0.000 | VII | $p(z^*) = 0.49(1+(z^*)^2/8.20)^{-2.92}$ |
| 0.0 | 20 | 0.000 | VII | $p(z^*) = 0.51(1+(z^*)^2/5.52)^{-2.68}$ |

$z^* = z/\sigma$

I claim:

1. A magnetic media having a surface which minimizes static and kinetic friction between the media surface and a read-write head placed in contact with the magnetic media, the magnetic media surface comprising a non-gaussian surface roughness distribution with a positive skewness value and a kurtosis value of 3 or greater, whereby static and kinetic friction with a read-write head in contact with the magnetic media is minimized, the magnetic media in combination with a read-write head in contact with a surface of the magnetic media, in combination with a lubricating layer between the magnetic media and the read-write head.

2. The combination of claim 1 wherein the read-write head has a non-gaussian surface roughness distribution with a positive skewness value and kurtosis value of 3 or greater.

3. The magnetic media of claim 1 wherein the magnetic media with a non-gaussian surface roughness distribution with a positive skewness value and a kurtosis value of 3 or greater is a disk.

4. The magnetic storage media of claim 1 wherein the magnetic media with a non-gaussian surface roughness distribution with a positive skewness value and a kurtosis value of 3 or greater is a tape.

5. The magnetic storage media of claim 1 wherein the magnetic media is data, audio or video recording media.

6. In combination, at least two objects each having a surface in contact with the other, one of said two objects being movable relative to the other object while remaining in contact with the other object, at least one surface of at least one of said objects having a positive skewness and a kurtosis of 3 or greater, and a lubricating layer between the two objects.

7. The combination of claim 6 wherein each of the surfaces of the objects in contact have a positive skewness and a kurtosis of 3 or greater.

* * * * *